United States Patent
Wada

(10) Patent No.: US 12,045,391 B2
(45) Date of Patent: Jul. 23, 2024

(54) TACTILE PRESENTATION DEVICE AND TACTILE PRESENTATION METHOD

(71) Applicant: Nippon Telegraph and Telephone Corporation, Tokyo (JP)

(72) Inventor: Toshiki Wada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/642,021

(22) PCT Filed: Sep. 13, 2019

(86) PCT No.: PCT/JP2019/036051
§ 371 (c)(1),
(2) Date: Mar. 10, 2022

(87) PCT Pub. No.: WO2021/048998
PCT Pub. Date: Mar. 18, 2021

(65) Prior Publication Data
US 2024/0045504 A1 Feb. 8, 2024

(51) Int. Cl.
*G09G 5/00* (2006.01)
*G06F 3/01* (2006.01)

(52) U.S. Cl.
CPC ................... *G06F 3/016* (2013.01)

(58) Field of Classification Search
None
See application file for complete search history.

(56) References Cited

U.S. PATENT DOCUMENTS

| | | | |
|---|---|---|---|
| 2007/0195059 A1* | 8/2007 | Shahoian | A63F 13/285 345/156 |
| 2014/0315642 A1* | 10/2014 | Grant | A63F 13/285 345/184 |
| 2015/0145657 A1 | 5/2015 | Levesque et al. | |
| 2017/0269686 A1 | 9/2017 | Khoshkava et al. | |
| 2018/0190087 A1 | 7/2018 | Maalouf et al. | |

FOREIGN PATENT DOCUMENTS

| | | |
|---|---|---|
| JP | 2015111416 A | 6/2015 |
| JP | 2017168104 A | 9/2017 |
| JP | 2018109999 A | 7/2018 |

OTHER PUBLICATIONS

Eto et al., "A Touch Panel Technique Providing Tactile Feedback by Electrical Stimulation", IPSJ Interaction 2012, Mar. 16, 2012, pp. 105-112.

\* cited by examiner

*Primary Examiner* — Carl Adams
(74) *Attorney, Agent, or Firm* — Slater Matsil, LLP

(57) ABSTRACT

An embodiment tactile presentation method includes: generating a first stimulus signal in a first frequency band; generating a second stimulus signal in a second frequency band, the second frequency band different from the first frequency band; applying the first stimulus signal from a first application member to a skin surface of a living body; and applying the second stimulus signal from a second application member to the skin surface.

18 Claims, 12 Drawing Sheets

TACTILE PRESENTATION DEVICE AND TACTILE PRESENTATION METHOD

CROSS-REFERENCE TO RELATED APPLICATIONS

This application is a national phase entry of PCT Application No. PCT/JP2019/036051, filed on Sep. 13, 2019, which application is hereby incorporated herein by reference.

TECHNICAL FIELD

The present invention relates to a tactile presentation apparatus and a tactile presentation method, and in particular relates to haptic technology.

BACKGROUND

In recent years, there have been many attempts to present not only visual and auditory sensations but also tactile sensations for the purpose of improving realistic sensations and the like. For example, techniques for presenting a tactile experience to a user in order to enhance a virtual reality (VR) experience have been developed. In addition to VR, haptic technology of feeding back tactile sensations by applying force, vibration, movement, and the like to the user is expected to be used in a wide range of fields including mobile technology and entertainment such as games.

For example, NPL 1 discloses a tactile presentation apparatus including a touch display provided with a conductive layer on a surface thereof. In the tactile presentation apparatus according to NPL 1, an electrical stimulus is applied to a fingertip of a user to provide tactile feedback in response to the user's pressing of a touch panel. Further, in the tactile presentation apparatus described in NPL 1, gradual vibration in accordance with a pressing pressure of the touch display by the user is generated by controlling a strength of the electrical stimulus.

CITATION LIST

Non Patent Literature

NPL 1: Eto, Haruna, et al. "A Touch Panel Technique Providing Tactile Feedback by Electrical Stimulation," IPSJ Interaction 2012, 3.16.2012. pp. 105-112

SUMMARY

Technical Problem

However, in the technique described in NPL 1, the tactile sensation is fed back by generating an electrical stimulus and applying the stimulus to the user, and the tactile sensation is presented within a range corresponding to the characteristics of the element generating the electrical stimulus, such as an electrode. In the existing tactile presentation devices, there are many tradeoffs with respect to time responsiveness, device size, interface configuration, and the like, which may further limit the range of the electrical stimulus that can be generated.

In this way, only a single tactile presentation technique has been used in the existing tactile presentation devices, making it difficult to provide more diverse tactile feedback.

The embodiments of the present invention have been made to solve the problems described above, and an object of embodiments of the present invention is to provide a tactile presentation technique capable of providing more diverse tactile feedback.

Means for Solving the Problem

In order to solve the problems described above, a tactile presentation apparatus in accordance with an embodiment includes a first stimulus generation device configured to generate a first stimulus signal by air pressure, a second stimulus generation device configured to generate a second stimulus signal by electricity, a first application member configured to apply the first stimulus signal to a skin surface of a living body, and a second application member configured to apply the second stimulus signal to the skin surface.

In order to solve the problems described above, a tactile presentation method in accordance with an embodiment includes generating a first stimulus signal by air pressure, generating a second stimulus signal by electricity, applying the first stimulus signal from a first application member to a skin surface of a living body, and applying the second stimulus signal from a second application member to the skin surface.

Effects of Embodiments of the Invention

According to embodiments of the present invention, a first stimulus signal by air pressure is generated and applied to a skin surface of a living body, and a second stimulus signal by electricity is generated and applied to the skin surface, making it possible to provide more diverse tactile feedback.

DETAILED DESCRIPTION OF ILLUSTRATIVE EMBODIMENTS

Preferred embodiments of the present invention will be described below in detail with reference to FIGS. 1 to 12. Note that, in the present specification, the term "tactile sensation" includes, from among visual, auditory, balance, odor, taste, touch, pain, warm, and cold sensations of a human, touch, pain, warm, and cold sensations that are external mechanical stimuli and external or internal stimuli. Further, "tactile sensation" includes skin sensations generated by signals from various receptors present under the skin, and deep sensations generated by signals from receptors carrying information related to a state of muscle contraction and the like.

First Embodiment

A tactile presentation apparatus 1 according to a first embodiment of the present invention will be described with reference to FIGS. 1 to 8.

Tactile receptors present in the epidermis, dermis, and subcutaneous tissue of the skin (for example, Merkel's corpuscle (SA I), Meissner's corpuscle (FA I), Ruffini's corpuscle (SA II), Pacinian corpuscle (FA II), and the like) each have an apportioned frequency band and physical quantity to which the tactile receptor can respond. Human tactile receptors including these are known to react to mechanical vibration at frequencies up to about 1000 Hz.

The tactile presentation apparatus 1 according to the present embodiment generates a stimulus signal (first stimulus signal) in a relatively low frequency band (1 to 10 Hz, for example) by air pressure and generates a stimulus signal (second stimulus signal) in a high frequency band (100 to 1000 Hz, for example) by electricity, each frequency band being among frequencies at which the tactile receptors can be stimulated. In this manner, a wide variety of tactile receptors are stimulated by stimulus signals generated by using air pressure and electricity and covering a wider frequency band to induce more diverse skin sensations and the like in a user.

Configuration of Tactile Presentation Apparatus

Figure 1:
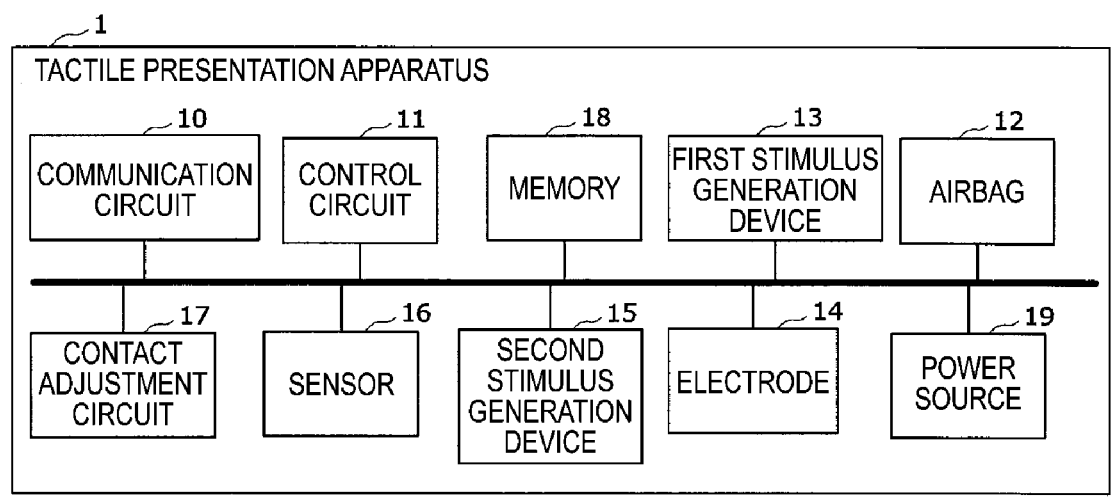
FIG. 1 is a block diagram illustrating a configuration example of a tactile presentation apparatus according to a first embodiment of the present invention.

As illustrated in FIG. 1, the tactile presentation apparatus 1 includes a communication circuit to, a control circuit 11, an airbag (e.g., first application member) 12, a first stimulus generation device 13, an electrode (e.g., second application member) 14, a second stimulus generation device 15, a sensor 16, a contact adjustment circuit (e.g., adjustment circuit) 17, and a power source 19.

The communication circuit to is an interface circuit for performing communication with various external electronic devices via a communication network. The communication circuit to can, for example, receive a command signal indicating generation and presentation of a stimulus signal having a set frequency from an external source, and transmit the signal to the control circuit 11.

The control circuit 11 transmits a control signal that causes each of the first stimulus generation device 13 and the second stimulus generation device 15 to generate a stimulus signal. For example, the control circuit 11 can transmit a control signal to either the first stimulus generation device 13 or the second stimulus generation device 15 in accordance with the frequency of the stimulus signal indicated by the command signal received by the communication circuit to. Further, the control circuit 11 controls the tactile presentation apparatus 1 in its entirety. The control circuit 11 can control the first stimulus generation device 13 and the second stimulus generation device 15 according to a tactile presentation program stored in a memory 18 in addition to the command signal received from an external source.

Figure 2:
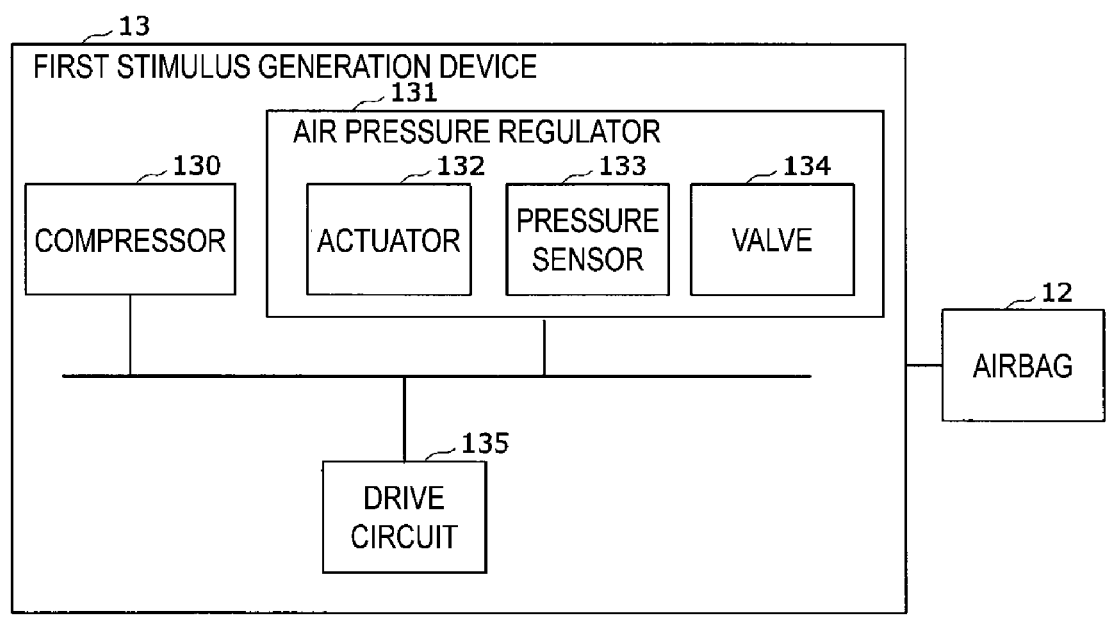
FIG. 2 is a block diagram illustrating a configuration example of a first stimulus generation device according to the first embodiment.

The airbag 12 is a flexible bag member in which air is held. The airbag 12 applies a stimulus signal, by air pressure, generated by the first stimulus generation device 13 to a skin surface of the user. The airbag 12 may be formed of a film of an elastic material that does not plastically deform. For example, a material such as silicon is used. The airbag 12 is electrically and mechanically connected to the first stimulus generation device 13, as illustrated in FIG. 2. The airbag 12 is disposed so as to come into contact with the skin surface of the user when the tactile presentation apparatus 1 is in use.

The first stimulus generation device 13 generates a stimulus signal by air pressure in accordance with a control signal from the control circuit 11. More specifically, the first stimulus generation device 13 generates a stimulus signal by air pressure using a total amount of air (cm$^3$/s, for example) held in the airbag 12 and an amount of air entering and exiting the airbag 12 as parameters.

As illustrated in FIG. 2, the first stimulus generation device 13 includes a compressor 130, an air pressure regulator 131, and a drive circuit 135. The drive circuit 135 drives the compressor 130 and the air pressure regulator 131.

The compressor 130 compresses the air injected into the airbag 12. The compressed air is fed to the air pressure regulator 131.

The air pressure regulator 131 uses the air compressed by the compressor 130 to periodically change the air pressure inside the airbag 12 and generate vibration as the stimulus signal by air pressure. The air pressure regulator 131 includes an actuator 132, a pressure sensor 133, and a valve 134, for example.

The actuator 132 injects the air compressed by the compressor 130 into the airbag 12 from a tube (not illustrated). The actuator 132 is driven by the drive circuit 135 to control the amount of air injected into the airbag 12.

The pressure sensor 133 measures the air pressure inside the airbag 12. In accordance with the measured air pressure, the actuator 132 adjusts the air to be injected into the airbag 12, for example. As the pressure sensor 133, a capacitance-type pressure sensor, for example, can be used. Note that a signal indicating the air pressure inside the airbag 12 measured by the pressure sensor 133 is transmitted to the control circuit 11.

The valve 134 is provided in the airbag 12 to discharge the air held inside the airbag 12 to the outside. When the air pressure inside the airbag 12 measured by the pressure sensor 133 is higher than the set air pressure, the valve 134 discharges air by opening and closing to reduce the air pressure inside the airbag 12. As the valve 134, an electromagnetic valve can be employed, for example.

The drive circuit 135 drives the compressor 130 and the air pressure regulator 131 in accordance with a control signal from the control circuit 11. Further, the drive circuit 135 drives the actuator 132 and the valve 134 in accordance with a control signal and changes the amount of air held inside the airbag 12 in accordance with the frequency of the stimulus signal specified by the control signal. This makes it possible to periodically change, by the air pressure, the pressure distribution on the surface where the airbag 12 is in contact with the skin surface of the user and output a stimulus signal having a desired frequency.

Figure 4:
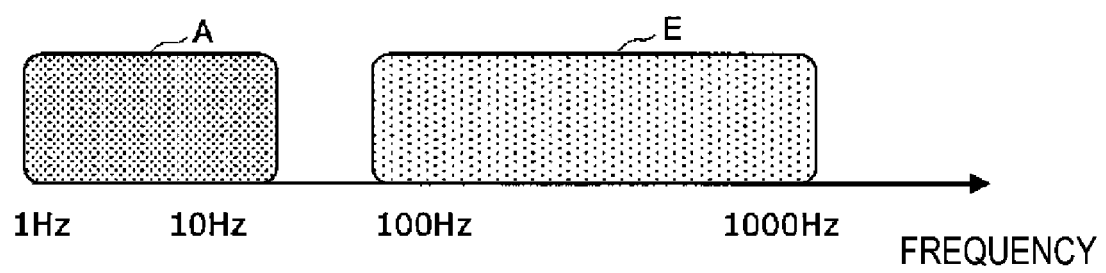
FIG. 4 is a diagram illustrating an example of a frequency band of a stimulus signal by air pressure and a frequency band of a stimulus signal by electricity.

FIG. 4 is a diagram schematically illustrating a frequency band A of the stimulus signal by air pressure and a frequency band E of the stimulus signal by electricity. In the example of FIG. 4, the frequency band A is approximately from 1 Hz to 10 Hz. As described above, the stimulus signal based on air pressure is generated by pressure obtained by physically changing the amount of air inside the airbag 12. Thus, a time constant of the airbag 12, which is a tactile presentation mechanism based on air pressure, is relatively large. For example, it is considered difficult to use the airbag 12 to generate and present to the user a stimulus signal at a frequency exceeding too Hz. Generally, a stimulus signal of about from 1 Hz to 20 Hz can be generated.

The electrode 14 provides an electrical stimulus to the skin surface of the user. As the electrode 14, a pair of electrodes can be used, for example. Further, the electrode 14 is electrically connected to the second stimulus generation device 15 that generates a stimulus signal by electricity. When the tactile presentation apparatus 1 is in use, the electrode 14 is disposed in contact with the skin surface of the user. Note that the electrode 14 may be designed to have a structure suitable for a specific tactile pattern to be presented to the user, such as, for example, a spatial shape to be presented.

Figure 3:
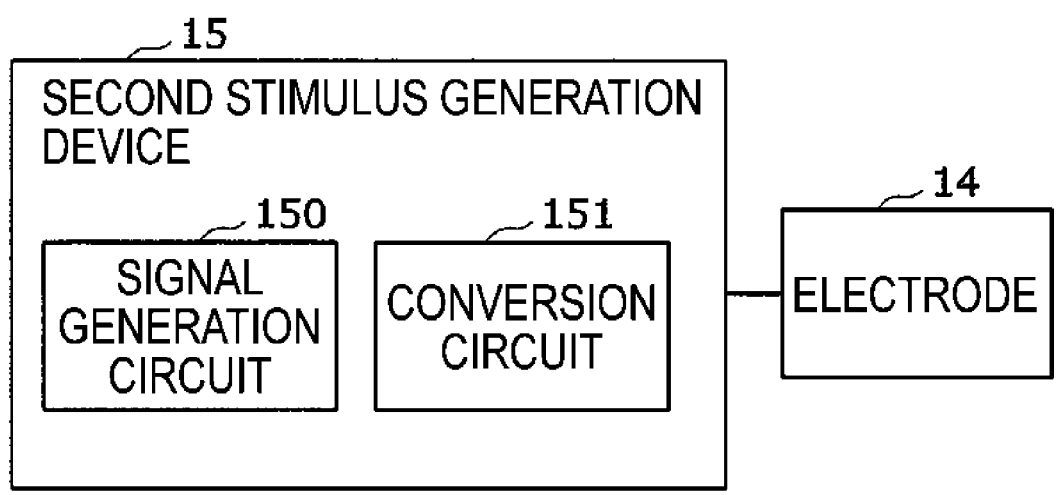
FIG. 3 is a block diagram illustrating a configuration example of a second stimulus generation device according to the first embodiment.

The second stimulus generation device 15 generates a stimulus signal by electricity in accordance with a control signal from the control circuit 11. As illustrated in FIG. 3, the second stimulus generation device 15 includes a signal generation circuit 150 and a conversion circuit 151.

The signal generation circuit 150 generates an electrical signal in accordance with a control signal from the control circuit 11. More specifically, the signal generation circuit 150 generates a signal having a pulse voltage waveform specified by the control signal and inputs the signal to the conversion circuit 151.

The conversion circuit 151 converts the signal having a pulse voltage waveform and generated by the signal generation circuit 150 into a pulse current. Further, the conversion circuit 151 boosts the converted pulse current to cause the current to flow through the skin, which has a high impedance. As the conversion circuit 151, a voltage-current converter that uses an operational amplifier and a power transistor can be used, for example.

The current output from the conversion circuit 151 is applied to the electrode 14. The current flowing from the electrode 14 disposed in contact with the skin surface of the user stimulates tactile receptors present under the skin to present a tactile sensation to the user.

As illustrated in FIG. 4, the frequency band E of the stimulus signal by electricity can be set to approximately from too Hz to 1000 Hz. In tactile presentation by an electrical stimulus, it may be difficult to present a stimulus by relatively low frequency. For example, when the frequency band A (FIG. 4) covered by a pneumatic stimulus is realized by an electrical stimulus, it is conceivable that the design may be difficult in terms of the relationship between pulse width, duty ratio, and frequency. Thus, in this embodiment, the stimulus signal by electricity employs a configuration that covers a higher frequency band of the frequencies that can stimulate tactile receptors.

Referring again to FIG. 1, the sensor 16 is constituted by a pressure sensor or the like and detects at least the presence or absence of contact between the electrode 14 and the skin surface of the user. For example, the sensor 16 can measure the extent of contact between the airbag 12 and the skin surface. Further, the sensor 16 is not limited to a pressure sensor and, for example, may be configured to calculate an impedance and detect the presence or absence of contact between the skin surface of the user and the tactile presentation apparatus 1 on the basis of an electrical signal generated by the second stimulus generation device 15 and applied to the electrode 14. Further, a plurality of sensors may be combined to detect the presence or absence of contact between the tactile presentation apparatus 1 and the skin surface of the user with greater accuracy.

When the sensor 16 detects that the electrode 14 and the skin surface of the user are not in contact with each other, the contact adjustment circuit 17 transmits, to the drive circuit 135, an instruction to inject a predetermined amount of air into the airbag (e.g., pressing member) 12 so that the electrode 14 and the skin surface of the user come into contact with each other. The drive circuit 135, in response to the instruction from the contact adjustment circuit 17, drives the compressor 130 and the air pressure regulator 131 to inject air into the airbag 12. In this case, the drive circuit 135 can adjust the air pressure of the airbag 12 by driving the air pressure regulator 131 at a lower speed than, for example, when generating the stimulus signal by air pressure.

The contact adjustment circuit 17 can maintain contact between the electrode 14 and the skin surface of the user. In addition, the contact adjustment circuit 17 can keep contact between the airbag 12 and the skin surface of the user in a more suitable state.

As the memory 18, a semiconductor memory or the like is used. The memory 18 stores in advance programs for the control circuit 11, the first stimulus generation device 13, the second stimulus generation device 15, and the contact adjustment circuit 17 to perform various controls and calculations.

The power source 19 adjusts the power supplied from a battery or a commercial power source and supplies power to the tactile presentation apparatus 1 that includes the control circuit 11.

Computer Configuration of Tactile Presentation Apparatus

Next, an example of a configuration of a computer for realizing the tactile presentation apparatus 1 having the above-described functions and configuration will be described with reference to FIG. 5.

Figure 5:
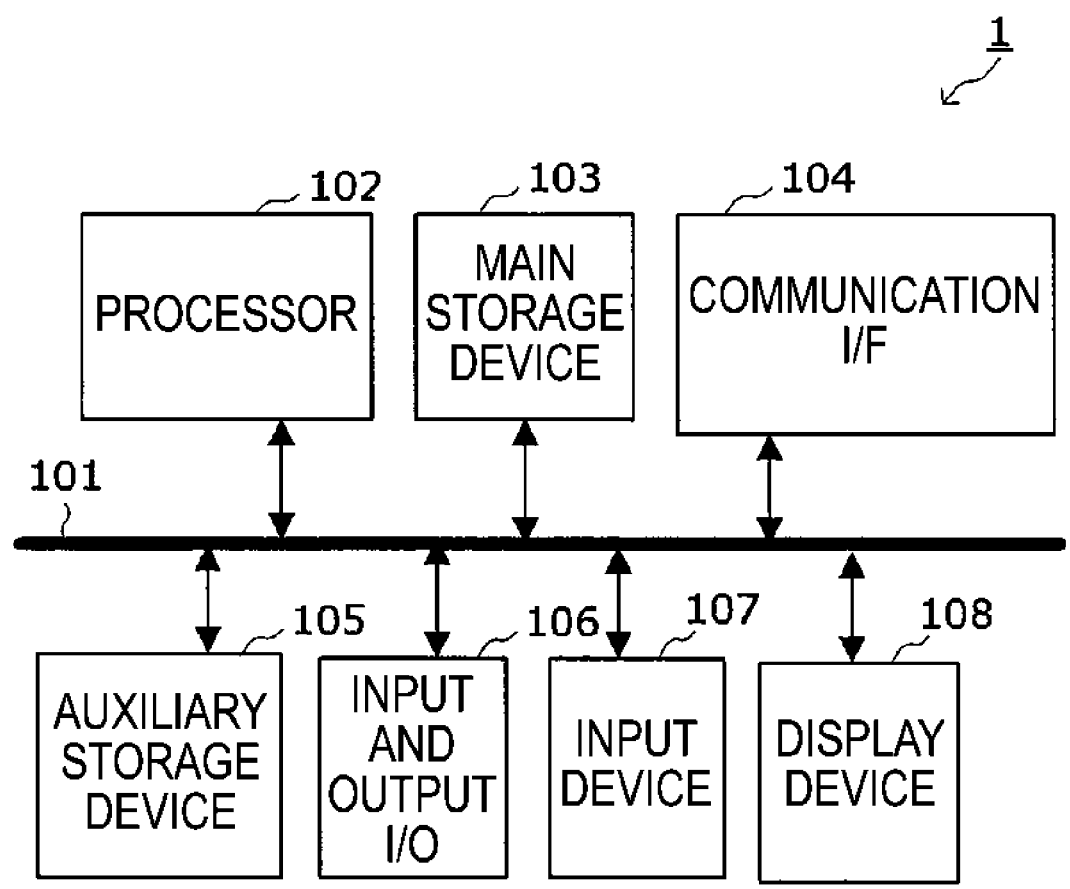
FIG. 5 is a block diagram illustrating an example of a computer configuration for implementing the tactile presentation apparatus according to the first embodiment.

As illustrated in FIG. 5, the tactile presentation apparatus 1 can be realized by, for example, a computer including a processor 102, a main storage device 103, a communication interface (I/F) 104, an auxiliary storage device 105, an input and output I/O 106, an input device 107, and a display device 108, which are connected via a bus tot, and a program that controls these hardware resources. Further, the airbag 12, the first stimulus generation device 13, the electrode 14, the second stimulus generation device 15, and the power source 19, which are not illustrated in FIG. 5, are connected to the tactile presentation apparatus 1 via the bus tot The main storage device 103 stores in advance programs for the processor 102 to perform various controls and calculations. The functions of the control circuit 11, including tactile presentation processing, are realized by the processor 102 and the main storage device 103.

The communication I/F 104 is an interface circuit for performing communication with various external electronic devices via a communication network NW.

As the communication I/F 104, for example, a communication control circuit and an antenna compatible with a wireless data communication standard such as LTE, 3G, 5G, wireless LAN, Bluetooth (trade name), or Bluetooth Low Energy are used. The communication I/F 104 realizes the communication circuit 10 described in FIG. 1. Note that the communication I/F 104 may also include a communication control circuit that performs wired communication.

The auxiliary storage device 105 includes a readable and writable storage medium and a drive device for reading and writing various information such as programs, data, and the like from and to the storage medium. A semiconductor memory such as a hard disk or a flash memory can be used as a storage medium of the auxiliary storage device 105.

The auxiliary storage device 105 includes a program storage area in which a program used by the control circuit 11 to generate a control signal and perform the tactile presentation processing is stored. Further, the auxiliary storage device 105 may have, for example, a backup area for backing up the data, programs, and the like described above. The auxiliary storage device 105 realizes the memory 18 described in FIG. 1.

The input/output I/O 106 is constituted by an I/O terminal that receives an input of a signal from an external device or outputs a signal to the external device.

The input device 107 is realized by a touch panel or the like and generates an operation signal in accordance with a touch operation.

The display device 108 is realized by a liquid crystal display or the like and displays an operating condition and the like of the tactile presentation apparatus 1.

Specific Configuration of Tactile Presentation Apparatus

Figure 6:
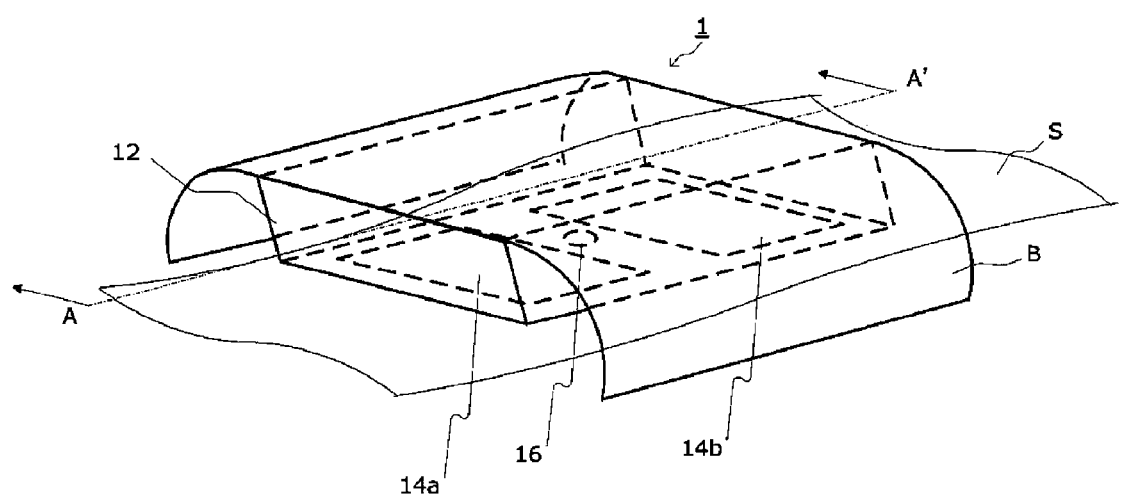
FIG. 6 is a schematic diagram illustrating a specific configuration example of the tactile presentation apparatus according to the first embodiment.
Figure 7:
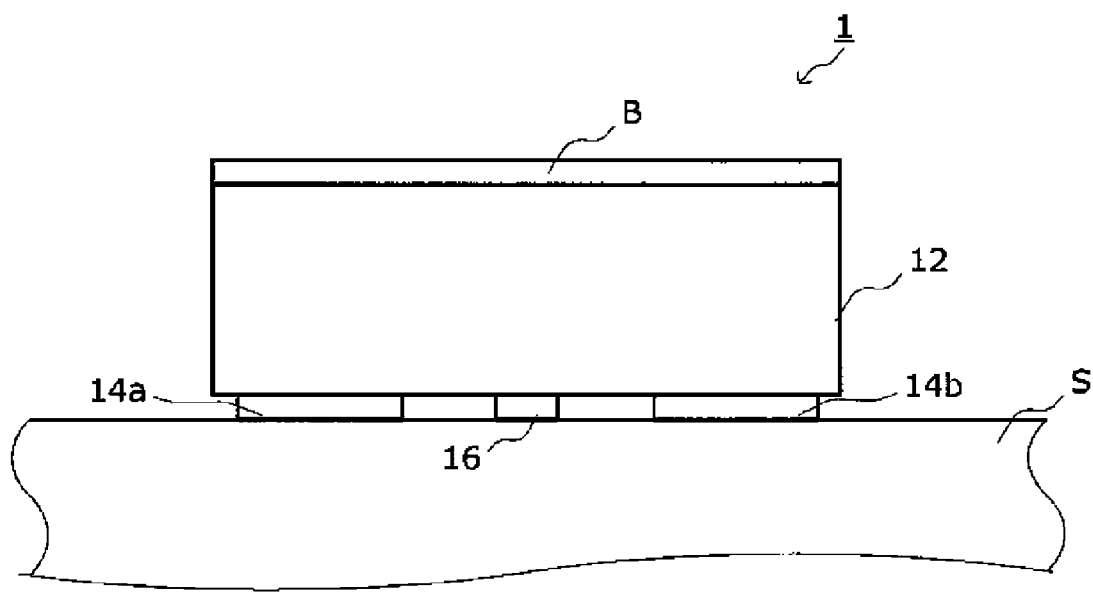
FIG. 7 is a cross-sectional view taken along the line A-A' of FIG. 6.

Next, a specific configuration example and arrangement example of the tactile presentation apparatus 1 will be described using FIGS. 6 and 7. Note that FIGS. 6 and 7 schematically illustrate the airbag 12, the electrode 14, the sensor 16, and a band B provided to the tactile presentation apparatus 1, and other configurations are omitted. In the following, a case in which the electrode 14 includes a pair of electrodes 14a, 14b will be described.

The band B secures the airbag 12 and the electrodes 14a, 14b to a skin surface S of the user. The band B can be formed from, for example, a fabric or a synthetic resin such as plastic or elastomer. For example, a hook-and-loop fastener can be secured around an area of the body of the user, such as a finger or a wrist. Alternatively, the band B may be constructed using a material such as a fabric having stretchability. The band B is not limited to a fabric or a synthetic resin, provided that the securing strength is constant.

In the example of FIGS. 6 and 7, the airbag 12 is formed in a rectangular parallelepiped shape, for example, and a bottom surface can be the surface that comes into contact with the skin surface. Further, the electrode 14a is formed in a rectangular sheet shape.

As illustrated in FIGS. 6 and 7, the airbag 12 and the electrodes 14a, 14b are disposed in this order on the skin surface S side of the user, as viewed from the band B. In addition, the airbag 12 and the electrodes 14a, 14b are disposed in contact with each other.

The electrodes 14a, 14b are spaced apart from each another and disposed on the bottom surface of the airbag 12. The sensor 16 is provided between the electrodes 14a, 14b in a horizontal direction (direction along line A-A'), for example. Further, the sensor 16 is disposed between the airbag 12 and the skin surface S in a vertical direction (A-A' line cross-sectional direction).

Tactile Presentation Method

Figure 8:
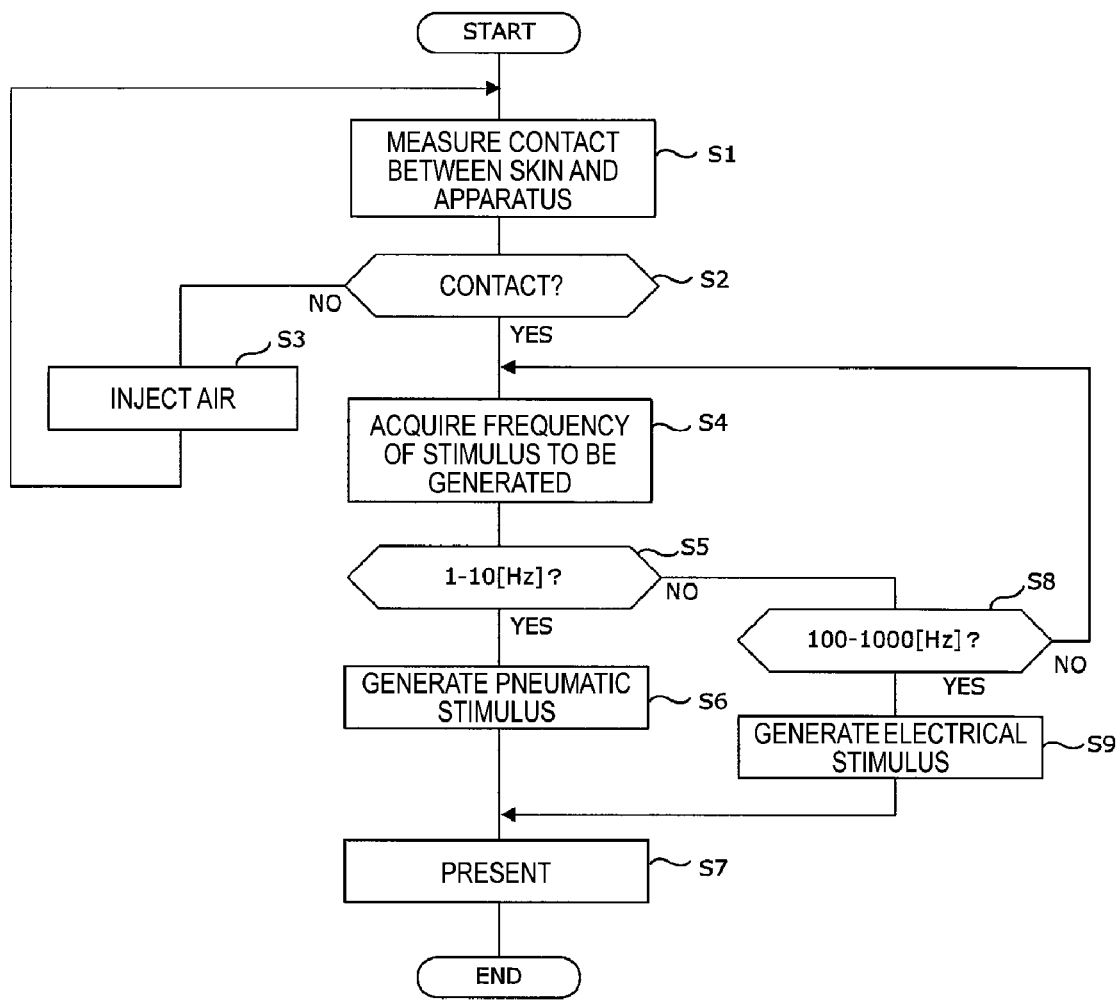
FIG. 8 is a flowchart describing a tactile presentation method according to the first embodiment.
Figure 9:
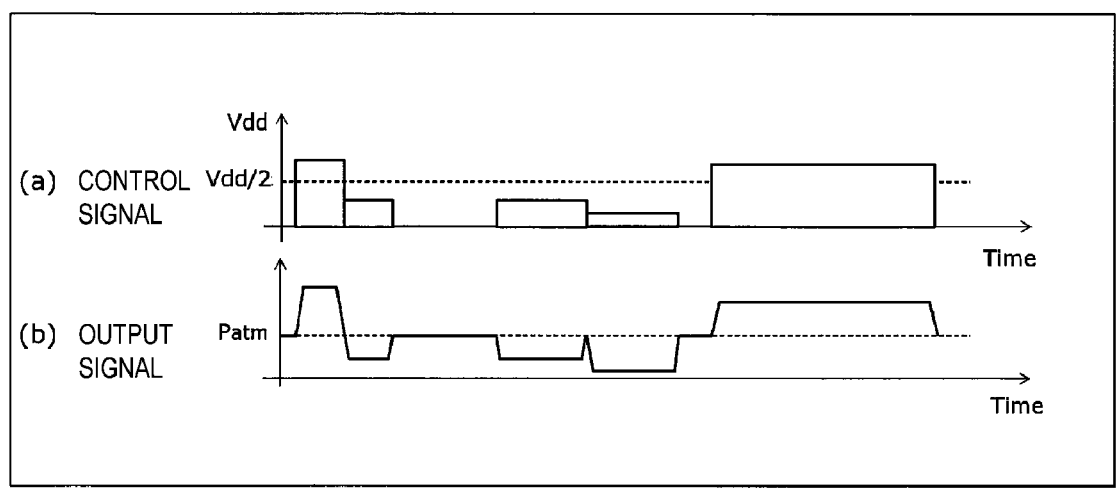
FIG. 9 is a diagram for describing a generation process of a pneumatic stimulus according to the first embodiment.
Figure 10:
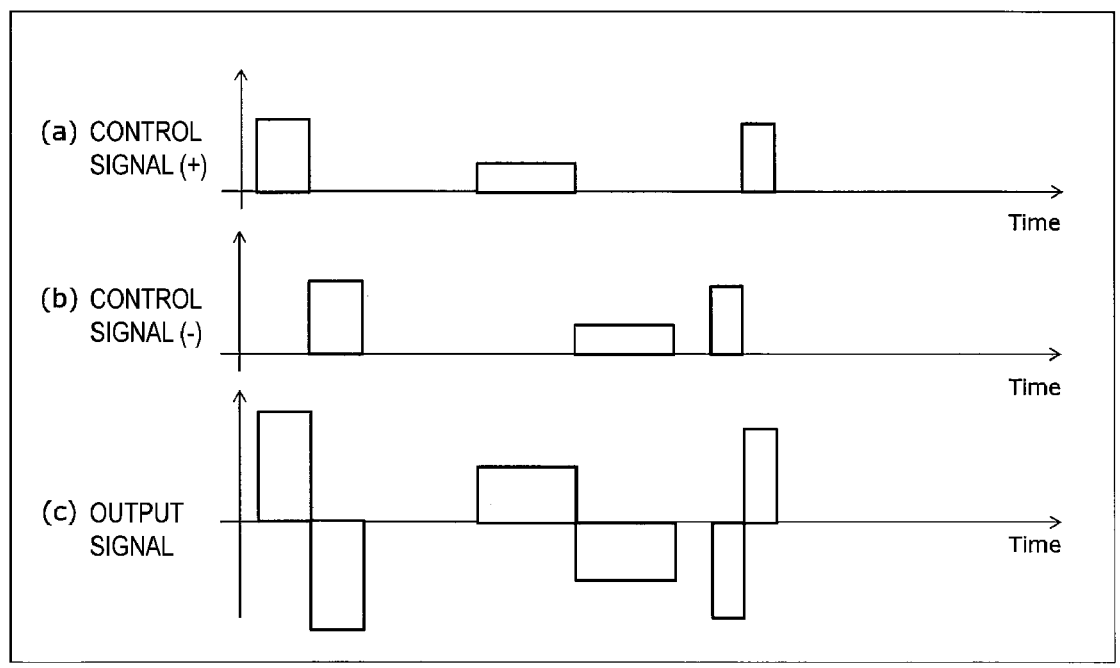
FIG. 10 is a diagram for describing a generation process of an electrical stimulus according to the first embodiment.

Next, the operation of the tactile presentation apparatus 1 having the configuration described above will be described with reference to a flowchart of FIG. 8. In the following, the tactile presentation apparatus 1 is secured in advance by the band B to an area of the body that includes the skin surface to be presented with a tactile sensation, such as a finger of the user.

First, the sensor 16 measures contact between the skin surface of the user and the tactile presentation apparatus 1 (step S1). Next, in a case in which it is detected that the electrode 14 and the skin surface are not in contact with each other from sensor data indicating the contact state between the skin surface and the tactile presentation apparatus 1 measured by the sensor 16 (step S2: NO), the contact adjustment circuit 17 injects air into the airbag 12 (step 3). More specifically, the contact adjustment circuit 17 transmits a command signal to the drive circuit 135 and drives the compressor 130 and the air pressure regulator 131 to inject an amount of air specified by the command signal into the airbag 12.

On the other hand, in a case in which it is detected in step S2 that the skin surface of the user and the electrode 14 are in contact with each other (step S2: YES), the control circuit 11 acquires information including the frequency of the stimulus signal to be generated (step S4). For example, the control circuit 11 can acquire the frequency of the stimulus signal specified by the command signal received by the communication circuit to from an external server or the like. Alternatively, information related to the frequency of the set stimulus signal can be acquired according to the tactile presentation program stored in the memory 18.

Next, in a case in which the specified frequency of the stimulus signal is within the range of from 1 to 10 Hz (step S5), the control circuit 11 transmits a control signal to the first stimulus generation device 13 to generate a pneumatic stimulus (step S6). The first stimulus generation device 13 injects air into and discharges air from the airbag 12 to periodically change the air pressure of the airbag 12 and generate a stimulus signal.

More specifically, as illustrated in FIGS. 9(a) and 9(b), a pressure in the airbag 12 is denoted as Pout, a specified pressure received from the control circuit 11 is denoted as Pset, an atmospheric pressure is denoted as Patm, and a power source level is denoted as Vdd. In this case, the first stimulus generation device 13 controls the air pressure in the airbag 12 so that Pout always equals Patm in a state of Vdd/2.

On the other hand, in a case in which the specified frequency of the stimulus signal is within the range of from too to moo Hz (step S8: YES), the control circuit 11 transmits a control signal to the second stimulus generation device 15 to generate an electrical stimulus (step S9). The second stimulus generation device 15 generates a pulse current at the specified frequency and applies the pulse current to the electrode 14.

More specifically, as illustrated in FIGS. 10(a), 10(b), and 10(c), the second stimulus generation device 15 receives positive (+) and negative (−) control signals from the control circuit 11. In response, a high voltage for output is generated by the signal generation circuit 150 and is converted to a current by the conversion circuit 151.

Subsequently, the airbag 12 applies a pneumatic stimulus to the skin surface of the user, presenting the user with a tactile sensation (step S7). On the other hand, after step S9, the electrode 14 applies an electrical stimulus to the skin surface of the user, presenting the user with a tactile sensation (step S7).

Note that the stimulus signal by air pressure and the stimulus signal by electricity presented to the user may be presented simultaneously. Further, the tactile sensation may also be presented by a stimulus pattern obtained by combining a pneumatic stimulus and an electrical stimulus as desired.

As described above, according to the tactile presentation apparatus 1 according to the first embodiment, the stimulus signal by air pressure and the stimulus signal by electricity are generated and applied to the skin surface of the user, making it possible to provide diverse tactile feedback by stimulus signals of a wider frequency band.

Further, according to the first embodiment, contact between the electrode 14 and the skin surface of the user is measured by the sensor 16 and the amount of air in the airbag 12 is adjusted, making it possible to maintain a contact state between the electrode 14 and the skin surface of the user and provide tactile feedback more reliably.

Further, according to the first embodiment, the stimulus signal by air pressure and the stimulus signal by electricity are combined. Thus, not only can the device as a whole cover a wide frequency band, but also a tactile presentation having a higher gradation and a larger presentation area is realized.

Further, according to the first embodiment, a stimulus signal in a relatively low frequency band is generated using air pressure, making it possible to stably present a tactile sensation caused by a stimulus of a low frequency band in a simpler configuration.

Further, according to the first embodiment, the airbag 12 and the electrode 14 are disposed between the band B and the skin surface, making it possible to make the tactile presentation apparatus 1 more compact.

Note that, in the described embodiment, a case in which the air held by the airbag 12 is the atmosphere has been described, but the composition of a plurality of gases included in the air can be set as desired.

Second Embodiment

Next, a second embodiment of the present invention will be described. In the following description, the same components as those in the first embodiment described above will be denoted by the same reference signs and description thereof will be omitted.

In the first embodiment, as described in FIGS. 6 and 7, a specific configuration in which one airbag 12, the pair of electrodes 14a, 14b, and one sensor 16 are provided between the band B and the skin surface S of the user is described. In contrast, in the second embodiment, one airbag 12a is provided for one electrode 14a, and another airbag 12b, is provided for the other electrode 14b.

Note that the functional configuration of the tactile presentation apparatus 1 is the same as the configuration according to the first embodiment illustrated in FIGS. 1 to 5. Hereinafter, components different from those of the first embodiment will be mainly described.

Figure 11:
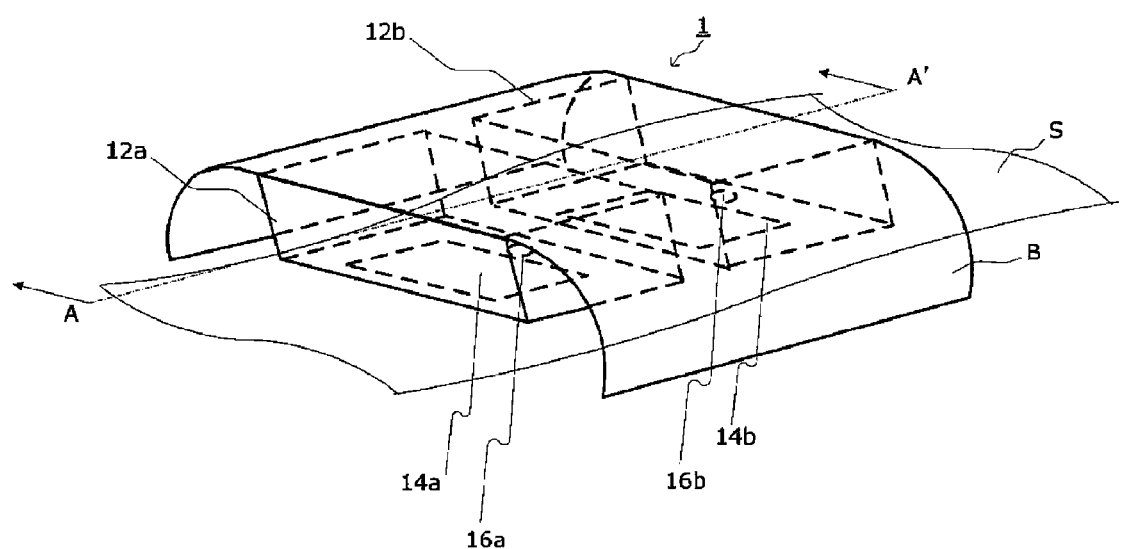
FIG. 11 is a schematic diagram illustrating a specific configuration example of a tactile presentation apparatus according to a second embodiment.
Figure 12:
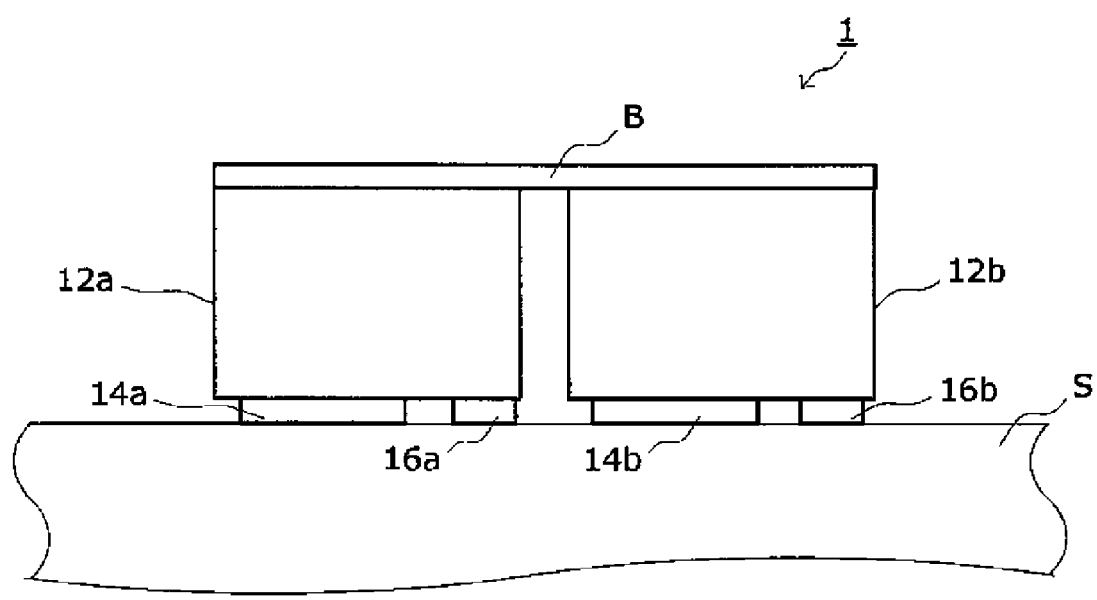
FIG. 12 is a cross-sectional view taken along the line A-A' of FIG. 11.

FIGS. 11 and 12 are schematic diagrams illustrating a specific configuration and an arrangement example of the tactile presentation apparatus 1 according to the embodiment. Note that FIGS. 11 and 12 omit the configurations of the tactile presentation apparatus 1 other than those of the band B, the airbags 12a, 12b, the electrodes 14a, 14b, and sensors 16a, 16b.

As illustrated in FIGS. 11 and 12, the airbags 12a, 12b, are spaced apart from each another and are contactably disposed with the skin surface. Further, the airbag 12a is in contact with the electrode 14a, and the airbag 1212b is in contact with the other electrode 14b. In the present embodiment, one sensor 16 (16a or 16b) is disposed in each airbag 12 (12a, 12b), and detects the presence or absence of contact between the electrode 14 (14a, 14b) and the skin surface.

In the example of FIGS. 11 and 12, the one band B secures the airbags 12a, 12b, the electrodes 14a, 14b, and the sensors 16a, 16b to the skin surface.

In the present embodiment, the two airbags 12a, 1213, are used, making it possible to apply stimulus signals by air pressure having different stimulus patterns from the respective airbags 12a, 1213, to the skin surface, and present tactile sensations.

Further, in the present embodiment, one of the electrodes 14a, 14b and one of the sensors 16a, 16b are provided to each of the airbags 12a, 12b. Therefore, in the present embodiment, the presence or absence of contact with the skin surface of each of the electrodes 14a, 14b is detected and the air pressures of the airbags 12a, 12b are adjusted to adjust the contact states between the electrodes 14a, 14b and the skin surface.

For example, in a case in which the tactile presentation apparatus 1 is disposed on the back of the user or the like, the size of the electrodes 14a, 14b increases. In such a case, the contact states of each of the electrodes 14a, 14b with the skin surface may differ, making this configuration particularly effective.

As described above, according to the second embodiment, one of the electrodes 14a, 14b and one of the sensors 16a, 16b are provided to each of the plurality of airbags 12a, 12b, making it possible to more reliably maintain contact between the electrodes 14a, 14b and the skin surface and provide tactile feedback.

Further, according to the second embodiment, each of the plurality of airbags 12a, 12b can independently provide a stimulus signal by air pressure to the skin surface, realizing more diverse tactile feedback.

Although the embodiments of the tactile presentation apparatus and the tactile presentation method of the present invention have been described above, the present invention is not limited to the described embodiments, and various types of modification that can be conceived by a person skilled in the art can be made within the scope of the invention described in the aspects.

REFERENCE SIGNS LIST

1 Tactile presentation apparatus
10 Communication circuit
11 Control circuit
12 Airbag
13 First stimulus generation device
14, 14a, 14b Electrode
15 Second stimulus generation device
16 Sensor
17 Contact adjustment circuit
18 Memory
19 Power source
130 Compressor
131 Air pressure regulator
132 Actuator
133 Pressure sensor
134 Valve
135 Drive circuit
150 Signal generation circuit
151 Conversion circuit
101 Bus
102 Processor
103 Main storage device 104 Communication I/F
105 Auxiliary storage device
106 Input and output I/O
107 Input device
108 Display device
B Band
S Skin surface

The invention claimed is:

1. A tactile presentation method comprising:
generating a first stimulus signal in a first frequency band;
generating a second stimulus signal in a second frequency band, the second frequency band being different from the first frequency band;
applying the first stimulus signal from a first application member to a skin surface of a living body, the first application member comprising an airbag configured to provide a stimulus to the skin surface through contact with the skin surface; and
applying the second stimulus signal from a second application member to the skin surface, the second application member comprising an electrode configured to provide an electrical stimulus to the skin surface through contact with the skin surface.

2. The tactile presentation method of claim 1 further comprising:
acquiring a frequency of a commanded stimulus signal;
applying the first stimulus signal from the first application member in response to the frequency of the commanded stimulus signal being within the first frequency band; and
applying the second stimulus signal from the second application member in response to the frequency of the commanded stimulus signal being within the second frequency band.

3. The tactile presentation method of claim 1, further comprising:
injecting air into the airbag in response to determining the electrode is not in contact with the skin surface of the living body.

4. The tactile presentation method of claim 1, wherein the first stimulus signal is generated by air pressure, and the second stimulus signal is generated by electricity.

5. The tactile presentation method of claim 1, wherein the first frequency band is 1 to 10 Hz and the second frequency band is 100 to 1000 Hz.

6. A tactile presentation device comprising:
a first stimulus generation device configured to generate a first stimulus signal in a first frequency band;
a second stimulus generation device configured to generate a second stimulus signal in a second frequency band, the second frequency band being different from the first frequency band;
a first application member configured to apply the first stimulus signal to a skin surface of a living body, the first application member comprising an airbag configured to provide a stimulus to the skin surface through contact with the skin surface; and
a second application member configured to apply the second stimulus signal to the skin surface, the second application member comprising an electrode configured to provide an electrical stimulus to the skin surface through contact with the skin surface.

7. The tactile presentation device of claim 6, wherein:
the first stimulus generation device is configured to generate a pneumatic stimulus as the first stimulus signal; and
the second stimulus generation device is configured to generate a second electrical stimulus as the second stimulus signal.

8. The tactile presentation device of claim 7, wherein:
the first application member comprises the airbag in which air is held; and
the first stimulus generation device comprises:
a compressor configured to compress air to be injected into the airbag;
an air pressure regulator configured to periodically change an air pressure inside the airbag by using the air compressed by the compressor and to generate a vibration; and
a drive circuit configured to drive the air pressure regulator to cause the air pressure regulator to generate the vibration as the first stimulus signal.

9. The tactile presentation device of claim 8, wherein the airbag comprises a film of an elastic material.

10. The tactile presentation device of claim 8, wherein the first application member comprises a plurality of airbags in each of which air is held.

11. The tactile presentation device of claim 8, wherein the second application member comprises a plurality of electrodes.

12. The tactile presentation device of claim 7, wherein:
the second stimulus generation device comprises a signal generation circuit configured to generate an electrical signal to apply to the electrode.

13. The tactile presentation device of claim 7, further comprising:
a sensor configured to detect presence or absence of contact between the second application member and the skin surface;
a pressing member configured to bring the second application member into contact with the skin surface; and
an adjustment circuit configured to adjust the pressing member to bring the second application member and the skin surface into contact with each other in a case in which the sensor detects that the second application member and the skin surface are not in contact with each other.

14. The tactile presentation device of claim 13, further comprising:
a compressor configured to compress air,
wherein the pressing member comprises a bag member in which air is held, and
wherein the adjustment circuit is configured to allow the compressor to inject air into the bag member in the case in which the sensor detects that the second application member and the skin surface are not in contact with each other.

15. The tactile presentation device of claim 6, further comprising:
a band configured to secure the first application member and the second application member to the skin surface,
wherein the first application member and the second application member are disposed in this order in a direction from the band to the skin surface, and
wherein the first application member and the second application member are in contact with each other.

16. The tactile presentation device of claim 6, wherein the first frequency band is 1 to 10 Hz and the second frequency band is 100 to 1000 Hz.

17. A tactile presentation device comprising:
a first stimulus generation device configured to inject air into an airbag in response to receiving a first control signal;

a second stimulus generation device configured to apply an electrical signal to an electrode in response to receiving a second control signal, wherein the airbag and the electrode are disposed so as to come into contact with a skin surface of a living body;

a control circuit configured to:

receive a command signal from an external device;

acquire a frequency of a stimulus signal specified by the command signal;

transmit the first control signal to the first stimulus generation device in response to the frequency of the stimulus signal being within a first frequency band; and transmit the second control signal to the second stimulus generation device in response to the frequency of the stimulus signal being within a second frequency band, wherein the second frequency band is different from the first frequency band.

18. The tactile presentation device of claim 17, wherein the first frequency band is 1 to 10 Hz and the second frequency band is 100 to 1000 Hz.

* * * * *